United States Patent
Ashar et al.

(10) Patent No.: US 11,678,413 B2
(45) Date of Patent: Jun. 13, 2023

(54) MODULAR MULTI-SENSOR, MULTI-CHANNEL CONTROL DEVICE IN A RESIDENTIAL ENVIRONMENT

(71) Applicant: Nuro Technologies, Inc., Sunnyvale, CA (US)

(72) Inventors: Premal Ashar, Sunnyvale, CA (US); George Scolaro, Sunnyvale, CA (US); Robert Gulino, Saratoga, CA (US); Yashodhan R. Deshpande, Sunnyvale, CA (US)

( * ) Notice: Subject to any disclaimer, the term of this patent is extended or adjusted under 35 U.S.C. 154(b) by 0 days.

(21) Appl. No.: 17/025,623

(22) Filed: Sep. 18, 2020

(65) Prior Publication Data
US 2021/0084723 A1    Mar. 18, 2021

Related U.S. Application Data

(60) Provisional application No. 62/902,382, filed on Sep. 18, 2019.

(51) Int. Cl.
| | |
|---|---|
| H05B 45/10 | (2020.01) |
| H05B 47/185 | (2020.01) |
| H05B 45/20 | (2020.01) |
| H05B 45/37 | (2020.01) |

(52) U.S. Cl.
CPC ............. H05B 45/10 (2020.01); H05B 45/20 (2020.01); H05B 45/37 (2020.01); H05B 47/185 (2020.01)

(58) Field of Classification Search
CPC ........ E04F 21/244; E04F 21/04; E04G 21/10; E04G 21/185; A47K 3/40; H05B 45/10; H05B 45/20; H05B 45/37; H05B 47/185
See application file for complete search history.

(56) References Cited

U.S. PATENT DOCUMENTS

| | | | |
|---|---|---|---|
| 2015/0373796 A1* | 12/2015 | Bahrehmand | H05B 47/11 315/129 |
| 2016/0338167 A1* | 11/2016 | Steiner | H05B 47/105 |
| 2017/0102493 A1* | 4/2017 | Shivell | G02B 6/0083 |
| 2017/0117891 A1* | 4/2017 | Lohbihler | H05B 47/10 |

* cited by examiner

*Primary Examiner* — Minh D A
(74) *Attorney, Agent, or Firm* — Joseph L. Acayan

(57) ABSTRACT

Implementations generally relate to systems, apparatuses, and methods for providing a modular sensor device in a residential environment. In some implementations, a modular sensor device includes a base that attaches to a wall in a living space. The modular sensor device also includes a power unit coupled to a first side of the base, where the power unit receives power from a power source, and where the power unit includes one or more devices that control conditions in an environment of the living space. The modular sensor device also includes a control module removably coupled to a second side of the base, where the module receives power from the power unit, and where the control module performs one or more predetermined control functions.

18 Claims, 11 Drawing Sheets

200

MODULAR MULTI-SENSOR, MULTI-CHANNEL CONTROL DEVICE IN A RESIDENTIAL ENVIRONMENT

CROSS REFERENCE TO RELATED APPLICATIONS

This application claims priority from U.S. Provisional Patent Application No. 62/902,382, entitled "MODULAR MULTI-SENSOR, MULTI-CHANNEL CONTROL DEVICE IN A RESIDENTIAL ENVIRONMENT," filed on Sep. 18, 2019, which is hereby incorporated by reference as if set forth in full in this application for all purposes.

BACKGROUND

Home automation has been a long-term desire. Control systems enable aspects of a home such as lighting to be controlled. However, cost-effective and user-friendly home automation is still far away. Present home automation systems are expensive, hard to install, and difficult to update. Such home automation systems typically require a user to understand complicated and difficult instructions to control aspects of a home.

SUMMARY

Implementations generally relate to systems, apparatuses, and methods for providing a modular sensor device in a residential environment. In some implementations, a modular sensor device includes a base that attaches to a wall in a living space. The modular sensor device also includes a power unit coupled to a first side of the base, where the power unit receives power from a power source, and where the power unit includes one or more devices that control conditions in an environment of the living space. The modular sensor device also includes a control module removably coupled to a second side of the base, where the module receives power from the power unit, and where the control module performs one or more predetermined control functions.

Other aspects and advantages of the described implementations will become apparent from the following detailed description, taken in conjunction with the accompanying drawings, illustrating by way of example the principles of the described implementations.

DETAILED DESCRIPTION

Implementations generally relate to systems, apparatuses, and methods of a residential sensor device platform. In various implementations, the modular sensor device is a residential modular sensor switch that controls environmental conditions such as lighting and temperature in a living space.

In some implementations, a modular sensor device includes a base that attaches to a wall in a living space. The modular sensor device also includes a power unit coupled to a first side of the base, where the power unit receives power from a power source, and where the power unit includes one or more devices that control conditions in an environment of the living space. The modular sensor device also includes a control module removably coupled to a second side of the base, where the module receives power from the power unit, and where the control module performs one or more predetermined control functions.

Figure 1:
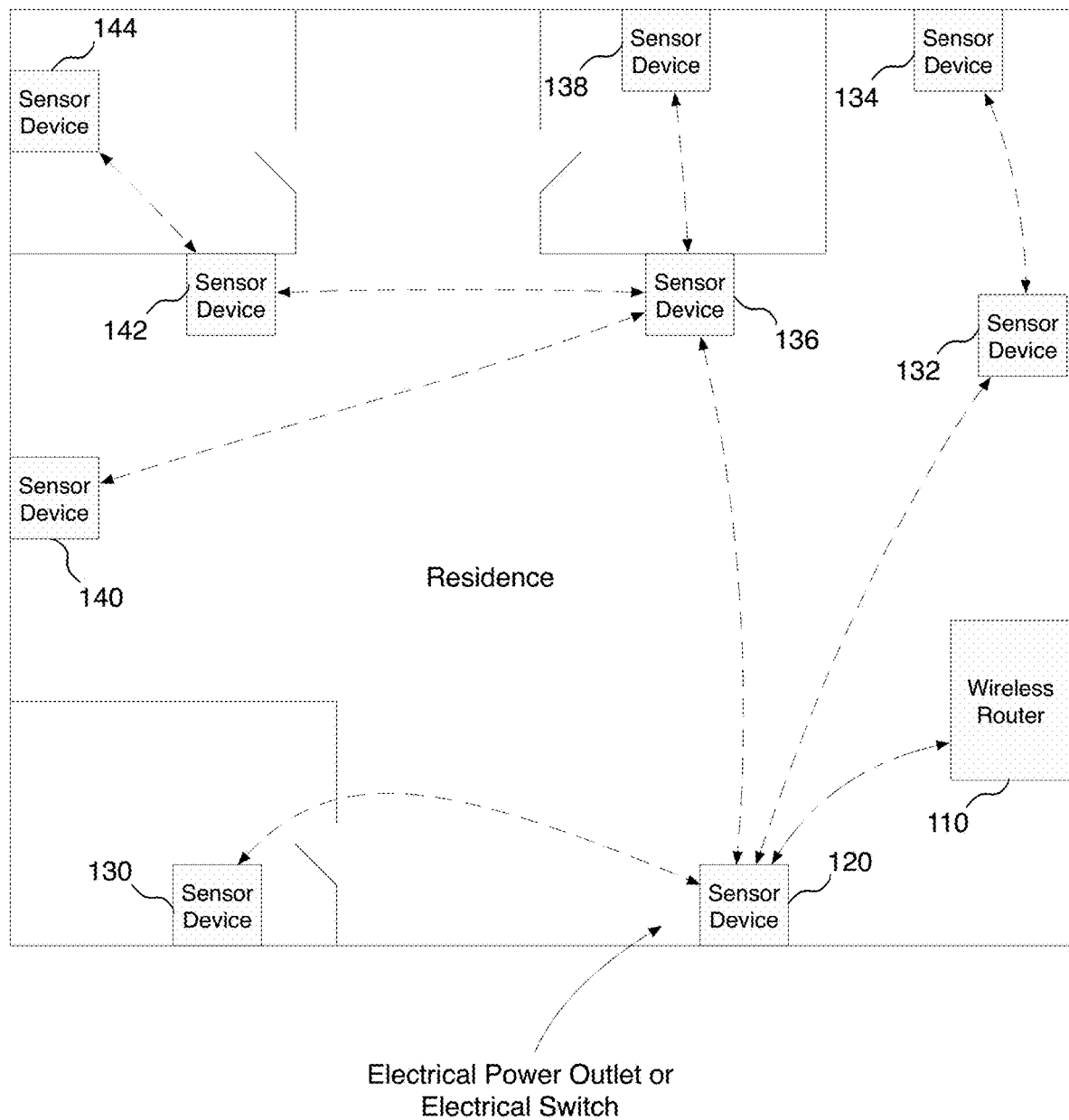
FIG. 1 illustrates a block diagram of an example residential sensor device environment, according to some implementations.

FIG. 1 illustrates a block diagram of an example residential sensor device environment 100, according to some implementations. In some implementations, the residential sensor device environment 100 includes a wireless router 110 and multiple sensor devices 120, 130, 132, 134, 136, 138, 140, 142, and 144. In various implementations, sensor devices 120, 130, 132, 134, 136, 138, 140, 142, and 144 form a wireless mesh network.

In various implementations, any one or more of the sensor devices 120, 130, 132, 134, 136, 138, 140, 142, and 144 may be a modular sensor device, wherein each modular sensor device is configured to receive a control module for controlling the environment of a living space. As described in more detail herein, various different types of control modules are interchangeable such that at any given time a control module attached to a given modular sensor device can be swapped out and exchanged with another control module.

In various implementations, different modular sensor devices may have different sets of functionalities. Functionalities may vary and will depend on the particular implementation. For example, in some implementations, a control module may include one or more electrical switches for controlling one or more lights in the living space. Another control module may include a touchscreen that receives control input from the user. Another control module may include one or more feedback mechanisms that provide feedback to a user operating the control module.

In various implementations, at least one sensor of sensor devices 120, 130, 132, 134, 136, 138, 140, 142, and 144 may include a control module that maintains a communication link with wireless router 110. In various implementations, such a sensor device may operate as the master sensor device, and other sensor devices may operate as non-master sensor devices to form a wireless mesh network.

While implementations are described herein in the context of sensor devices being wall-mounted devices, these implementations and other also apply to other contexts. For example, sensor devices may be configured to be placed on surfaces such as a table top or may be configured to attach to various other objects such as appliances.

Figure 2:
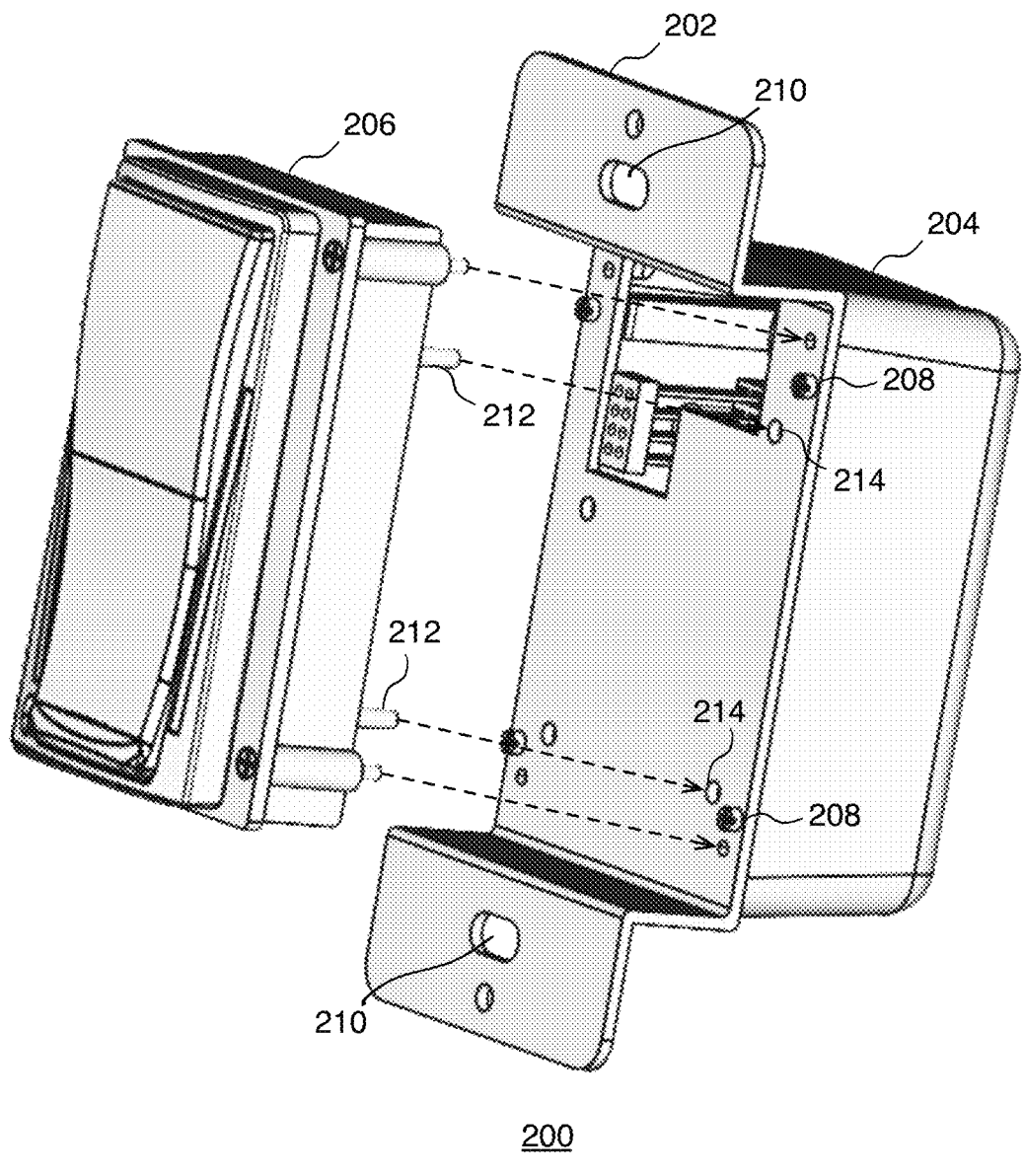
FIG. 2 illustrates a perspective view of an example modular sensor device, according to some implementations.

FIG. 2 illustrates a perspective view of an example modular sensor device 200, according to some implementations. In various implementations, modular sensor device 200 is a residential modular sensor device that controls environmental conditions such as lighting and temperature in a living space.

In various implementations, modular sensor device 200 includes a base 202, a power unit 204, and a control module 206. In various implementations, base 202 attaches to both power unit 204 and control module 206. Power unit 204 attaches to one side of base 202, and control module 206 attaches to the other side of base 202, such that base 202 is sandwiched between power unit 204 and control module 206.

In various implementations, power unit 204 receives high-voltage power from a power source. For example, in various implementations, the power source may be delivered by an electrical wire that leads to an electrical panel (e.g., electrical panel of a house, building, etc.). As such, power unit 204 handles alternating current (AC). In various implementations, power unit 204 provides low-voltage power to control module 206, where control module 206 handles direct current (DC).

In various implementations, modular sensor device 200 provides a hot swappable, low voltage user interface without the need for throwing circuit breakers and/or the requirement of an electrician. This is achieved by the modularity of modular sensor device 200 in that modular sensor device 200 separates the high-voltage alternating current (AC) power unit 204 from the low-voltage direct current (DC) control module 206. In various implementations, power unit 204 is a rear module that is placed in the wall, and control module 206 is a front module that is placed over power unit 204. Control module 206 faces the user, and is thus accessible to a user, while control module 206 covers power unit 204. Power unit 204 contains the high-voltage AC to prevent a user from making contact with the high-voltage AC. As such, any user can replace the front control module 206 without the need to turn off power at the distribution panel and/or to require a licensed electrician to perform the work.

In some implementations, power unit 204 may include a shield that is wired to the AC wires. The shield enables the user to safely replace the entire modular sensor device 200 or just the control module 206. In various implementations, if a user desires to change control module 206, the user need not discard the entire product/modular sensor device 200. Rather, the user may simply leave power unit 204 installed in the wall and replace just control module 206 with another type of control module 206 (e.g., a control module with a touch screen).

In various implementations, different control modules are available. For example, alternative control modules may include plug-n-play digital control modules. Such plug-n-play digital control modules may include but are not limited to a residential sensor network with machine learning and artificial intelligence (AI), voice technologies, vision technologies. The types of control modules may vary, depending on the particular implementation. For example, control modules may include controls for sensing and regulating smoke, air quality, carbon monoxide (CO), humidity, temperature, etc.

In various implementations, power unit 204 includes one or more dimming circuits (not shown) for providing power to one or more respective electrical switches at control module 206 for controlling one or more lights in a living space. The particular number of dimming circuits may vary depending on the particular implementation. In various implementations, control module 206 intelligently determines how many dimming circuits are available. As such, a given control module is compatible with different types of power units and may be moved from one power unit to another (e.g., in a different location or room in the living space). The control module adapts to the number of dimming circuits available at each power unit.

In various implementations, the dimming circuits provide respective load channels, where each load channel may provide channel dimmer switch functionality for different modules with different user interfaces (e.g., toggle switches, touch screens, etc.). The dimming circuits provide independent load channels within a single housing/dimmer switch. As such, each load may be a separate lighting branch circuit (e.g., for single or multiple light bulbs per branch), where each lighting branch circuit may be controlled by a separate dimmer. The dimming circuits may be used to provide independent channels for different zones in a given living space. For example, in a kitchen application, one dimming circuit may be dedicated to counter lights. Another dimming circuit may be dedicated to island lights. Another dimming circuit may be dedicated to a ceiling light, etc.

In some implementations, screws 208 may be used to attach base 202 to power unit 204. As shown, base 202 also functions as a protective cover that encloses power unit 204 at one side of power unit 204. This serves as a safety feature in that high-voltage wiring is hidden inside power unit 204 away from users. As such, base 202 and power unit 204 isolate high-voltage power within the power unit, thereby preventing users from contacting the high-voltage elements (e.g., connections, wiring, etc.).

As shown, base 202 includes holes 210 to enable base 202 to be attached by screws (not shown) to a wall (e.g., to an electrical box in a wall). Once base 202 is attached to a wall, base 202 and power unit 204 may remain in place for the long term (semi-permanently).

As described in more detail herein, control module 206 removably attaches to base 202. As shown, base 202 is shaped to receive control module 206. In some implementations, control module 206 includes guide posts 212 that guide module 206 into base 202. As indicated by arrows, guide posts 212 are inserted into holes 214. Only four guide posts and four corresponding holes are shown. The number of guide post-hole pairings may vary (e.g., eight pairings) depending on the particular implementation.

For ease of illustration, example implementation steps described herein are described in the context of a single control module, such as control module 206. These implementations and others may apply to control modules of any sensor devices, such as any one or more sensor devices of FIG. 1.

Figure 3:
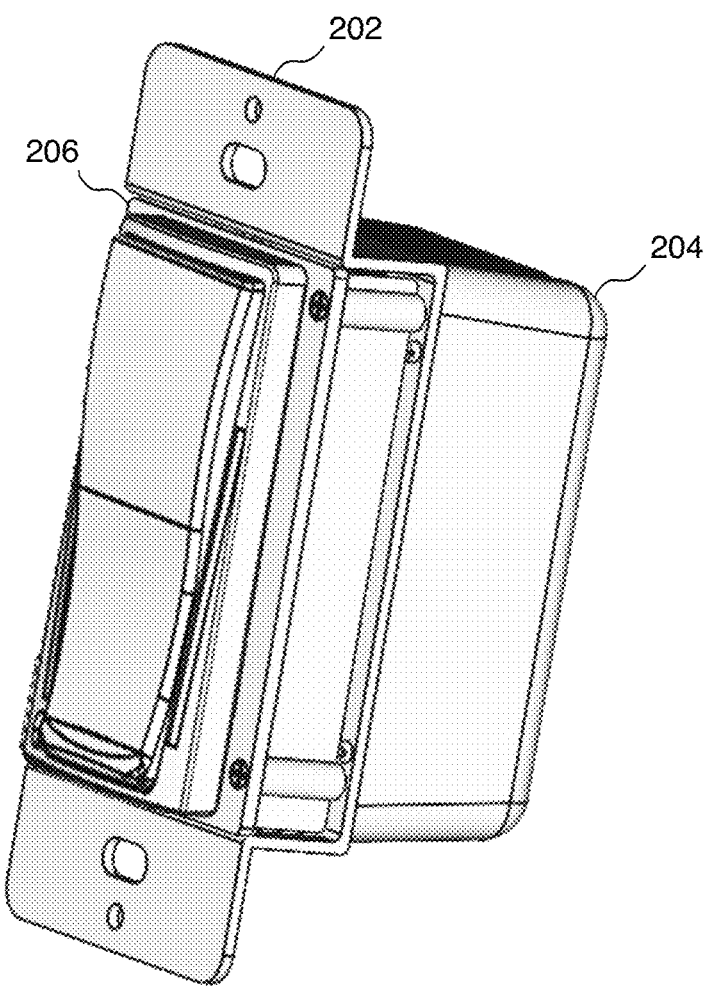
FIG. 3 illustrates another perspective view of the example modular sensor device with the control module attached to the base and power unit, according to some implementations.

FIG. 3 illustrates another perspective view of modular sensor device 200 with control module 206 attached to base 202 and power unit 204, according to some implementations. As shown, control module 206 is nestled into base 202. In some implementations, control module 206 may snap into place using friction (no screws). In this scenario, to remove control module 206, the user may pull on control module 206 with enough force to separate control module 206 from base 202. In some implementations, control module 206 may be secured to base 202 with any suitable fastening mechanism (e.g., one or more screws). As such, control module 206 is easily and conveniently removable from base 202. This allows for convenient upgrades such that control unit 206 may be swapped with a different control module, where base 202 and power unit 204 may remain in place, secured to the wall. Further operations of power unit 204 and control module 206 are described in more detail herein.

Figure 4:
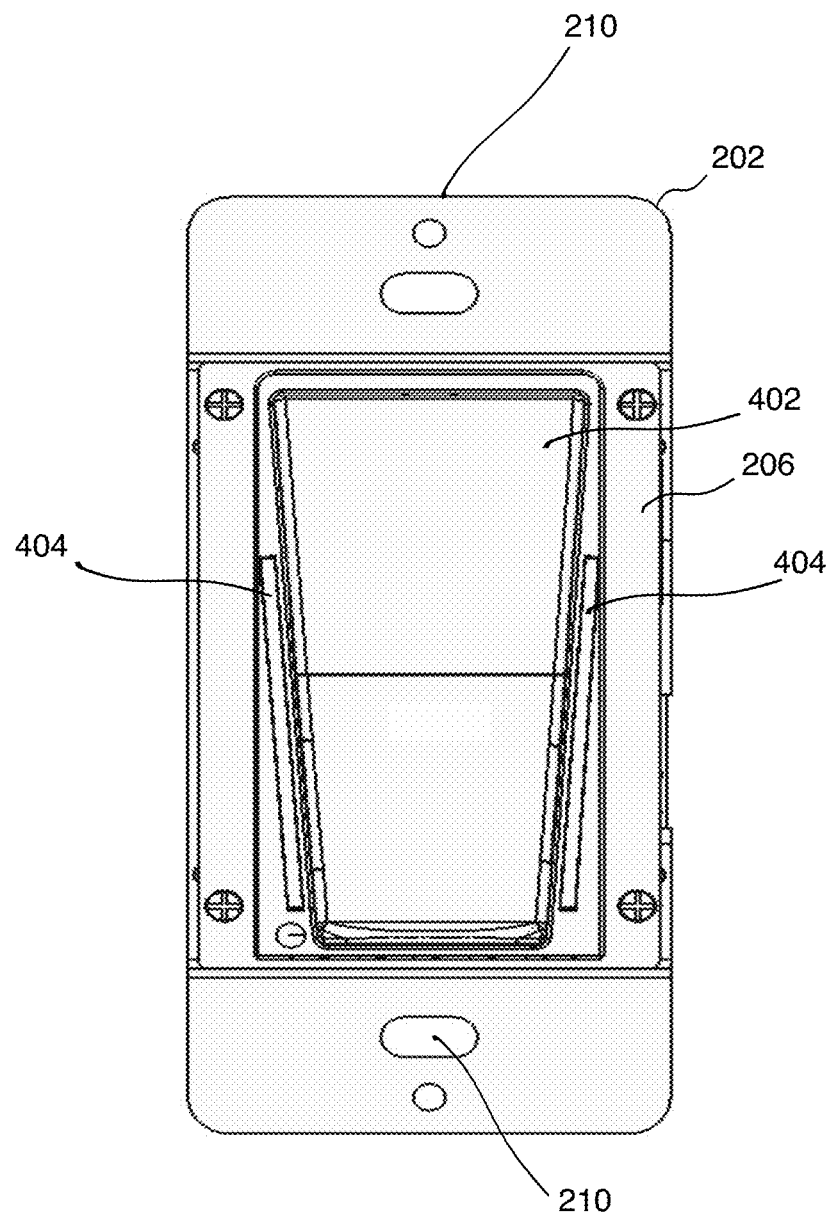
FIG. 4 illustrates front view of the example modular sensor device, according to some implementations.

FIG. 4 illustrates front view of modular sensor device 200, according to some implementations. Shown is base 202 and control module 206. Also shown are holes 210 for screwing base 202 to an electrical box in a wall. In various implementations, control module 206 performs one or more predetermined control functions for controlling conditions in the environment of a living space. For example, control module 206 may control one or more lights in the living space. Control module 206 may also control temperature. The particular environmental conditions to be controlled may vary with different types of control modules. In some implementations, control module 206 may also activate various applications to perform various functionalities.

In some implementations, a control module may include one or more electrical switches for controlling one or more lights in the living space. In this example implementation, control module 206 includes an electrical switch 402. The particular type of control interface may vary, depending on the particular implementation. For example, in this implementation, electrical switch 402 is a rocker switch.

In various implementations, control module 206 includes one or more feedback mechanisms that provide feedback to a user operating the control module. In this example, control module 206 includes light indicators 404 that provide visual feedback for the user. Such light indicators 404 may, for example, indicate an amount of brightness, where electrical switch 402 functions as dimmer or brightness control.

In various implementations, control module 206 includes one or more sensors (e.g., light sensors, occupancy sensors, etc.). The one or more sensors 406 may vary in type depending on the particular implementation. For example, sensors may be operative to sense the ambient light in the environment. Sensors may be operative to sense activity in the environment. Sensors may be operative to sense the temperature in the environment. In addition to light sensors and thermometers, sensors may also include motion sensors, barometers, moisture sensors, etc.

In various implementations, control module 206 includes a power switch (not shown). Power switch 408 turns control module 206 on and off. As described in more detail herein, control module 206 includes one or more processors, logic, memory, and communication devices (not shown) for controlling conditions in the environment of a living space. Power switch 408 enables power to these components.

In various implementations, user interfaces may vary with different control modules. For example, in some implementations, a control module may include a touchscreen that receives control input from the user. A touchscreen enables multiple controls for the environment. For example, a touchscreen may enable a user to program settings for controlling light, temperature, times of operation, etc.

In some implementations, a control module may include one or more sound mechanisms that provide audible feedback to a user operating the control module. For example, a control module may include a buzzer or speaker that indicates when a user selects a control. In some implementations, a control module may include one or more haptic mechanisms that provide tactile feedback to a user operating the control module.

Figure 5:
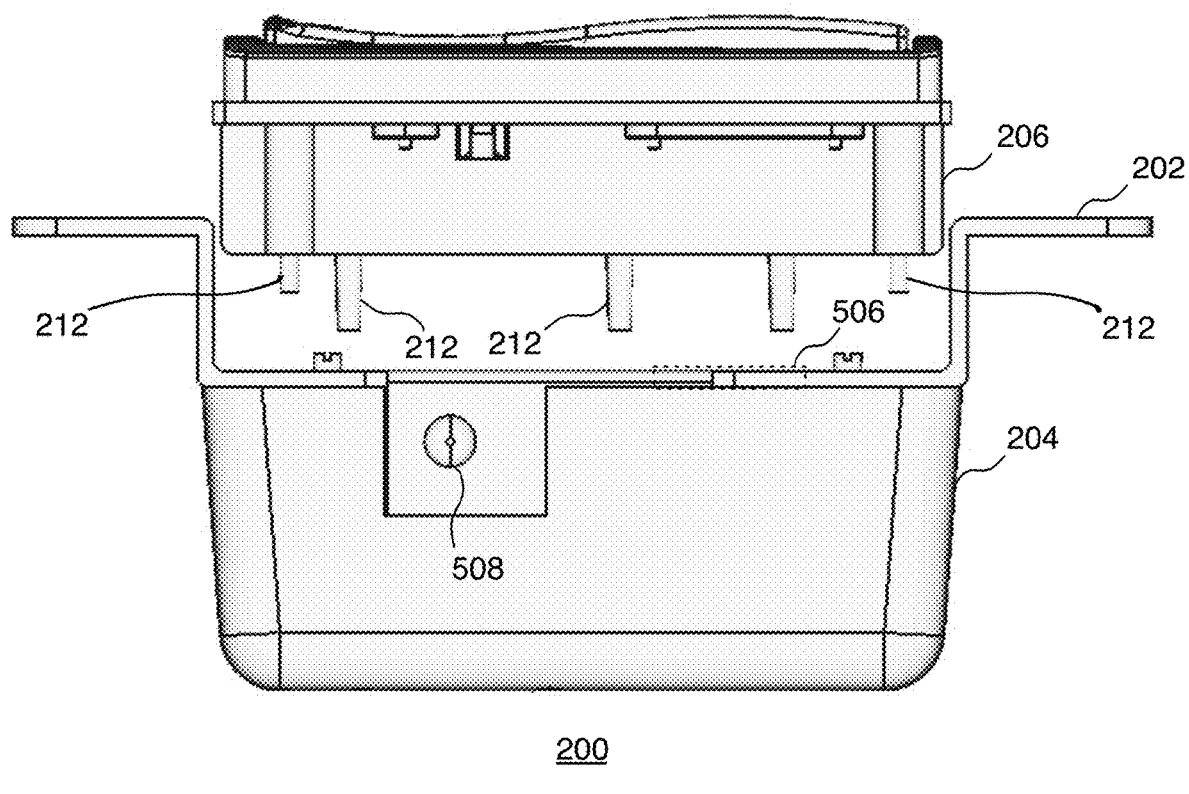
FIG. 5 illustrates a side view of an example modular sensor device with a control module separated from a base and power unit, according to some implementations.

FIG. 5 illustrates a side view of modular sensor device 200 with control module 206 separated from base 202 and power unit 204, according to some implementations. As shown, control module 206 is configured to be received into base 202, guided by guide posts 212.

Control module 206 includes a connector device (not shown) that connects to pins 506 of power unit 204. In this example implementation, there are 10 pins (e.g., 5×2 pins). The number of pins and their configuration may vary, depending on the particular implementation. Also shown is an optional rivet 508 for a dimming circuit. As indicated herein, in various implementations, there may be multiple dimming circuits. In some implementations, each dimming circuit may have a corresponding rivet. In some implementations, each dimming circuit is electrically connected to one of pins 506. In some implementations, a connector device (not shown) enables control module 206 to send control signals to devices of power unit 204, which are described in more detail herein.

Figure 6:
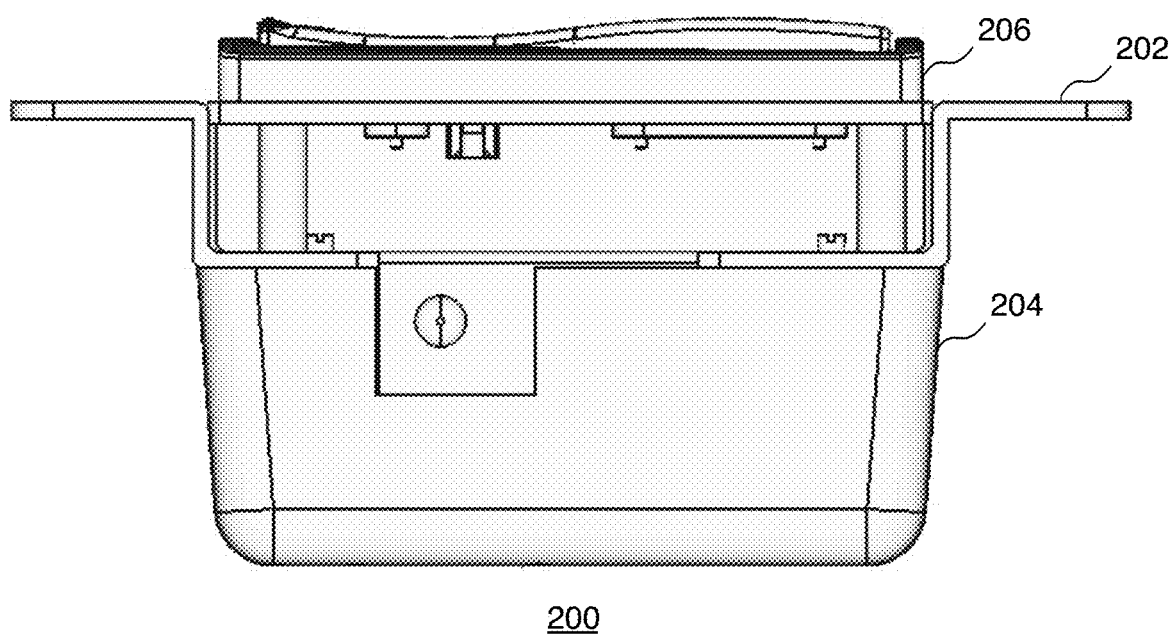
FIG. 6 illustrates another side view of the example modular sensor device with the control module attached to the base and power unit, according to some implementations.

FIG. 6 illustrates another side view of modular sensor device 200 with control module 206 attached to base 202 and power unit 204, according to some implementations. As shown, control module 206 is received into base 202.

Figure 7:
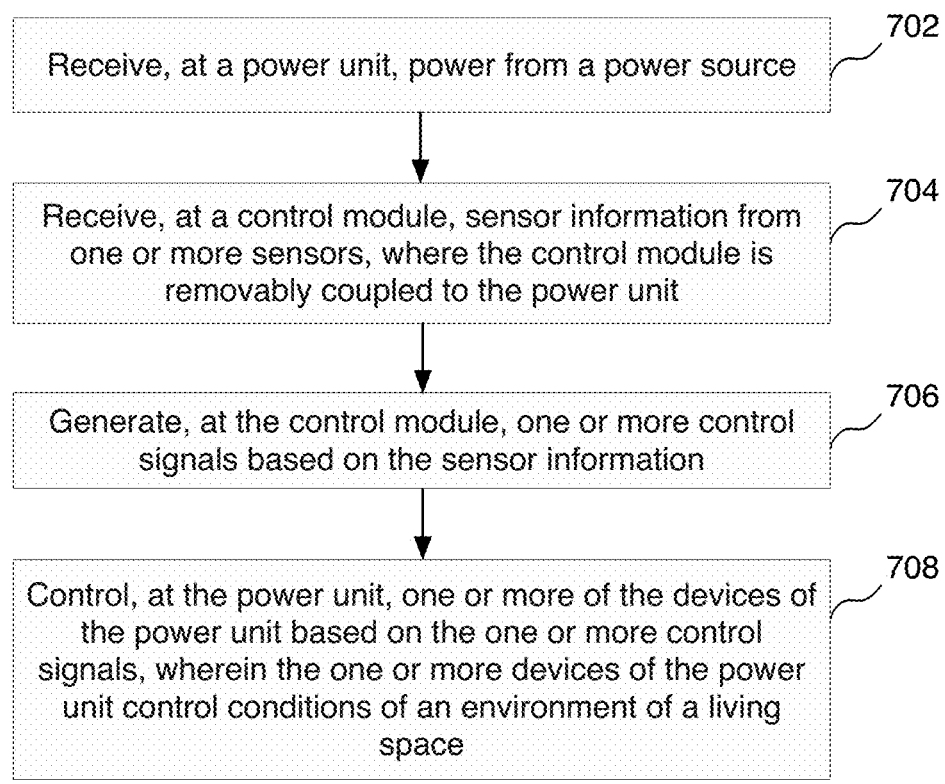
FIG. 7 illustrates an example flow diagram for operation of a modular sensor device, according to some implementations.

FIG. 7 illustrates an example flow diagram for operation of the modular sensor device, according to some implementations. In various implementations, a method is initiated at block 702, where modular sensor device 200 receives, at a power unit, power from a power source.

At block 704, modular sensor device 200 receives, at a control module, sensor information from one or more sensors, wherein the control module is removably coupled to the power unit. As indicated herein, sensors may vary in type depending on the particular implementation. Sensors may include light sensors, motion sensors, thermometers, barometers, moisture sensors, etc. In various implementations, modular sensor device 200 also generates one or more control signals based on commands from a user (e.g., when the user interacts with controls on control module 206).

At block 706, modular sensor device 200 generates, at a control module, one or more control signals based on the sensor information. For example, if a light sensor detects that the ambient light drops below a predetermined light level, modular sensor device 200 may generate a control signal to turn on one or more lights. In various implementations, modular sensor device 200 may also generate control signals based on commands from a user.

At block 708, modular sensor device 200 controls, at the power unit, one or more of the devices of the power unit based on the one or more control signals, wherein the one or more devices of the power unit control conditions of an environment of a living space. For example, such control signals may control light in the environment in the living space.

As indicated herein, power unit 204 includes various devices that control an environment of the living space. For example, at least one of the devices of the power unit is a dimming circuit that controls a brightness of one or more lights in the living space. In some implementations, at least one of the devices of the power unit is an energy metering device.

In various implementations, modular sensor device 200 may socialize with other modular sensor devices by sharing information with and learning from other sensor devices. For example, in various implementations, modular sensor device 200 may exchange user inputted information and/or activity information with other sensor devices in the network of sensor devices via a master sensor device and/or wireless router.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 8:
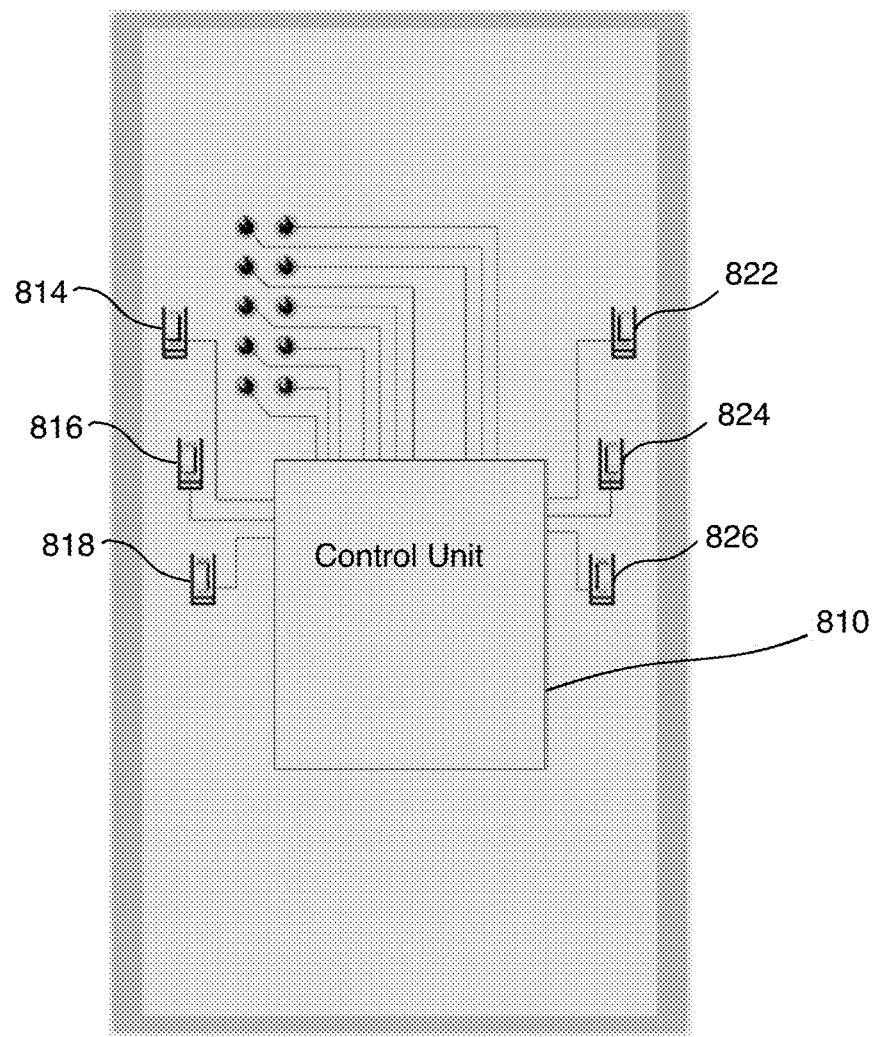
FIG. 8 illustrates a top view of an example circuit board for a control module, according to some implementations.

FIG. 8 illustrates a top view of an example circuit board 800 for a control module, according to some implementations. For example, circuit board 800 may be use to implement control module 206 of FIG. 2. Shown is a control unit 810. Control unit 810 may be used to implement the functions and embodiments of control module 206 of FIG. 2 described herein. For example, control module 206 may establish various operating modes (e.g., sleep mode, etc.). Control module 206 may provide dimming circuit channel selections and scene control, etc. In various implementations, control module 206 may provide an override function to choose a specific preset setting for the different dimming circuits. For example, in a large family room, one dimming circuit may control main room lighting fixtures, one dimming circuit may control accent lighting for artwork, and one dimming circuit may control reading lights, etc.

Control module 206 may also control various sensors described herein. For example, control module 206 may control a passive infrared (PIR) motion sensor, which may be used for occupancy/contextual-based sensing in a living space (e.g., motion of a person, pet, etc.). In another example implementations, control module 206 may control a temperature and humidity sensor, an ambient light sensor, etc. Also shown are light emitting diodes (LEDs) 814, 816, 818, 822, 824, and 826. Each of these LED may be a different type of LED, and the type of each LED will depend on the particular implementation. For example, in this particular implementation, LEDs 814, 816, 818, 822, 824, and 826 are white LEDs. These LEDs may indicate brightness levels for example.

In various implementations, the sensed data collected by control module 206 may be combined with user-configured preferences in order to govern how multiple load channels are activated and at what levels (e.g., independent on/off and brightness levels, etc.). For example, control module 206 may control lighting based on time of day, how long a person is detected, the type of motion, etc.

Figure 9:
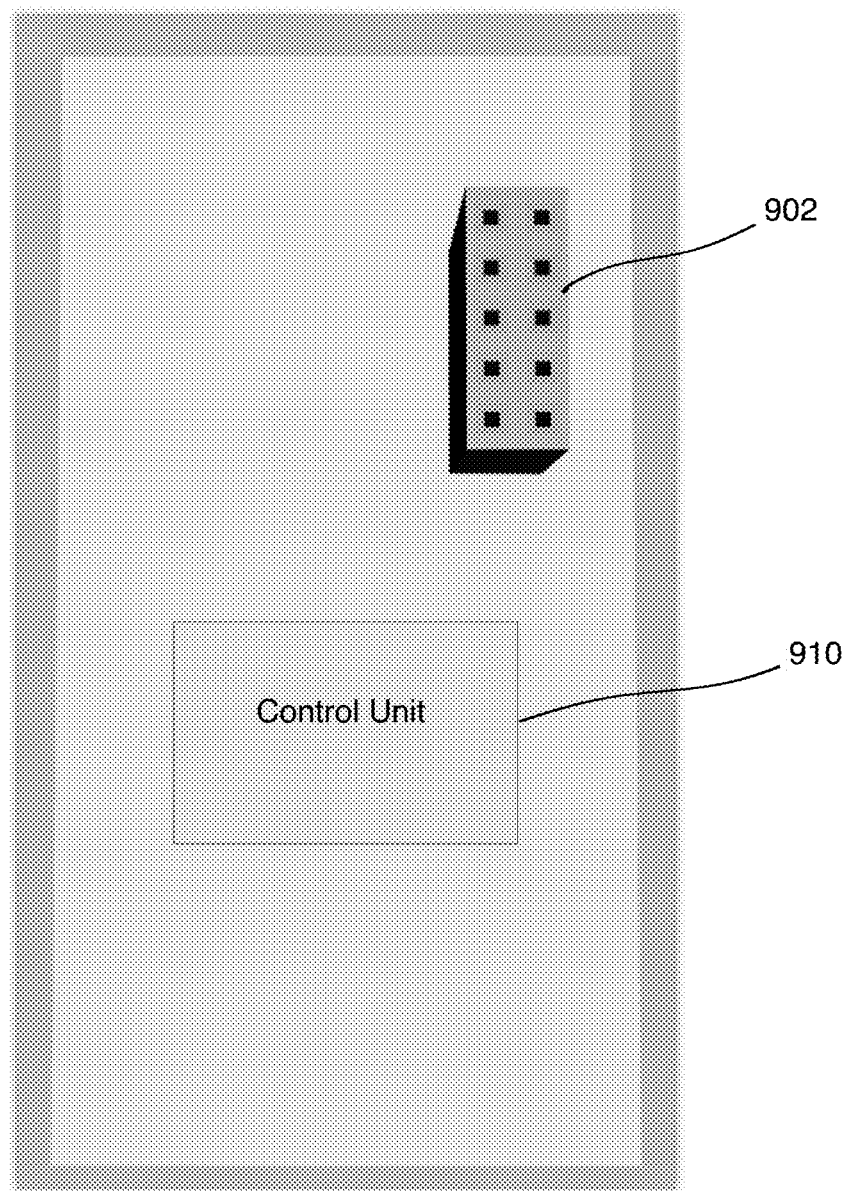
FIG. 9 illustrates a bottom view of the example circuit board of FIG. 8, according to some implementations.

FIG. 9 illustrates a bottom view of the example circuit board 800 of FIG. 8, according to some implementations. Shown is a system on chip (SOC) unit 902 with Wi-Fi capabilities and a control unit 910. In some implementations, SOC unit 902 enables control module 206 to communicate with other control modules and/or communication devices via Wi-Fi. Control unit 910 may be used for input/output (I/O) functionality as well as other functionalities.

In various implementations, circuit board 800 may not have all of the components shown and/or may have other elements including other types of elements instead of, or in addition to, those shown herein.

Figure 10:
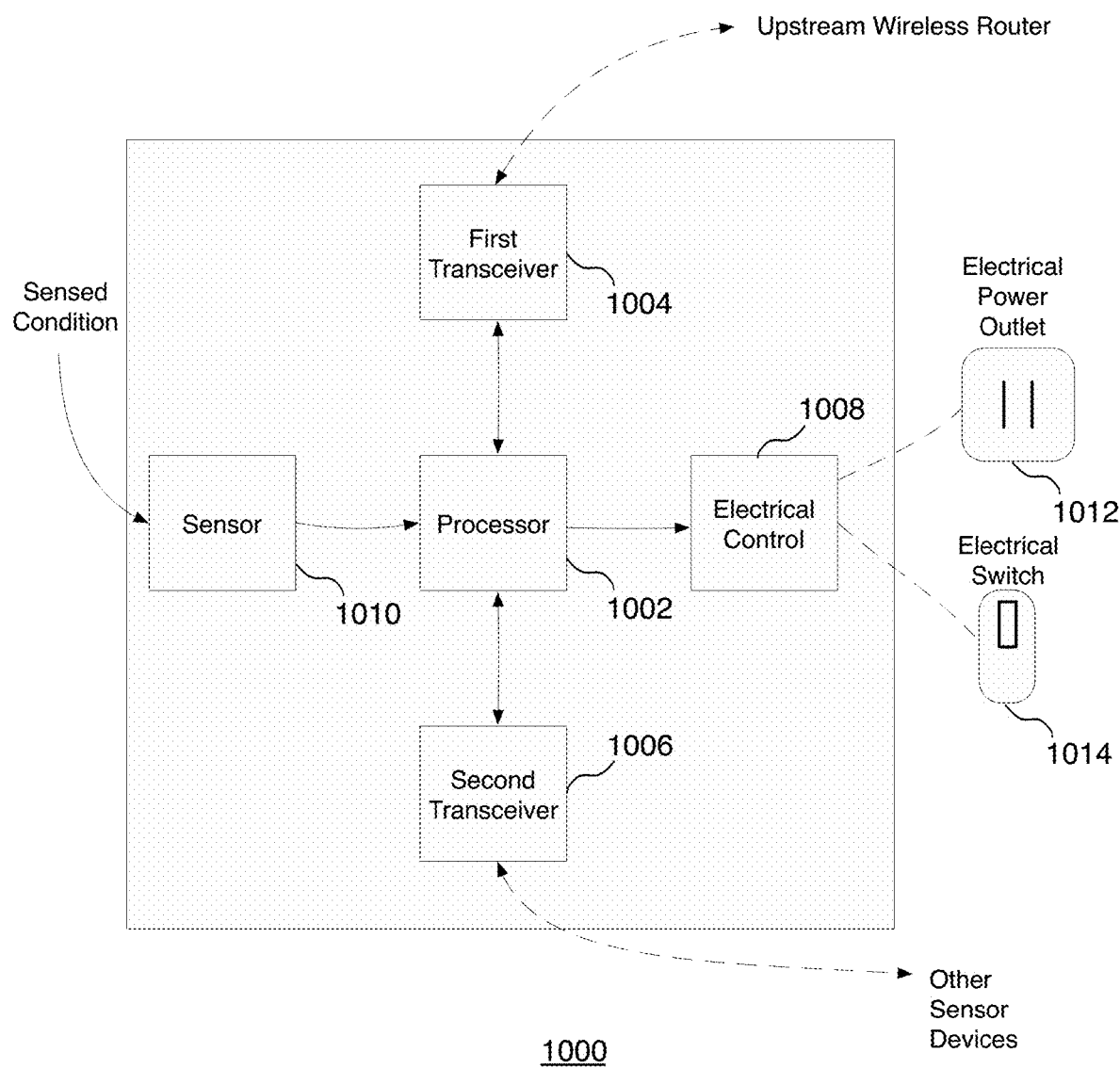
FIG. 10 illustrates a block diagram of an example modular sensor device, according to some implementations.

FIG. 10 illustrates a block diagram of an example modular sensor device 1000, according to some implementations. In various implementations, modular sensor device 1000 is a residential sensor device that is implemented in residential environments. Modular sensor device 1000 may also be referred to as residential sensor device 1000. Modular sensor device 1000 is not limited to residential environments and may be implemented in non-residential environments, including both indoor and outdoor environments. In various implementations, modular sensor device 1000 may be used to implement modular sensor device 200 and any sensor device of FIG. 1.

As shown, for this particular implementation, modular sensor device 1000 may be used to implement one or more of multiple sensor devices in a network, such as a wireless network, a wireless mesh network, etc.

In various implementations, when a first sensor device is configured, the rest of the sensor devices are self-configuring in that they automatically configure themselves based on the configuration of the first sensor device.

As described in more detail below, modular sensor device 1000 has a multi-virtual network interface (e.g., a dual interface, etc.). In some implementations, one interface may be used for an uplink mode (e.g., Internet mode) to link to a wireless router, etc. In some implementations, a second interface may be used for a mesh mode to link to mesh nodes, etc. For example, in various implementations, modular sensor device 1000 includes a controller or processor 1002. In various implementations, modular sensor device 1000 also includes a first transceiver 1004 operative to support uplink communication with a wireless router. In various implementations, the wireless router is an upstream wireless router. Modular sensor device 1000 also includes a second transceiver 1006 operative to support mesh link communication with other sensor devices. Modular sensor device 1000 also includes an electrical control 1008 that controls one or more electrical power outlets 1012 and/or one or more electrical switches 1014. In various implementations, modular sensor device 1000 includes a sensor 1010 operative to sense a condition of a living space. For ease in illustration, one sensor 1010 is shown. However, in various implementations, sensor 1010 may represent multiple sensors. For example, modular sensor device 1000 may include a light sensor, a motion sensor, a thermometer, a barometer, a moisture sensor, etc. In some implementations, processor 1002 is operative to communicate with the wireless router through the first transceiver, communicate with other sensor devices through the second transceiver, and receive the sensed condition of the living space. As indicated herein, a living space may include indoor and outdoor spaces.

In various implementations, if modular sensor device 1000 functions as a master sensor device, modular sensor device 1000 is configured with a dual link, having both an uplink to the upstream wireless mesh router and a mesh link to the other sensor devices of the mesh network. In various implementations, the other sensor devices of the mesh network (e.g., slave sensor devices) are configured only with the mesh link.

If any new sensor device is added to the mesh network, the new sensor device may self configure similar to the other non-master sensor devices of the wireless mesh network. As such, implementations provide automatic-range extender functionality.

For ease of illustration, FIG. 10 shows one block for each of processor 1002, first transceiver 1004, second transceiver 1006, electrical control 1008, sensor 1010, electrical power outlet 1012, and electrical switch 1014. Each of blocks 1002, 1004, 1006, 10010, 1010, 1012, and 1014 may represent multiple first transceivers, second transceivers, electrical controls, sensor devices, processors, electrical power outlets, and electrical switches.

In other implementations, modular sensor device 1000 may not have all of the components shown and/or may have other elements including other types of elements instead of, or in addition to, those shown herein. For example, modular sensor device 1000 may be implemented by computing device 1100 of FIG. 11, which is described in more detail below. In various implementations, modular sensor device 1000 may include a combination of some or all of the elements shown in FIGS. 10 and 11, and may include other types of elements instead of, or in addition to, those shown in FIGS. 10 and 11.

Figure 11:
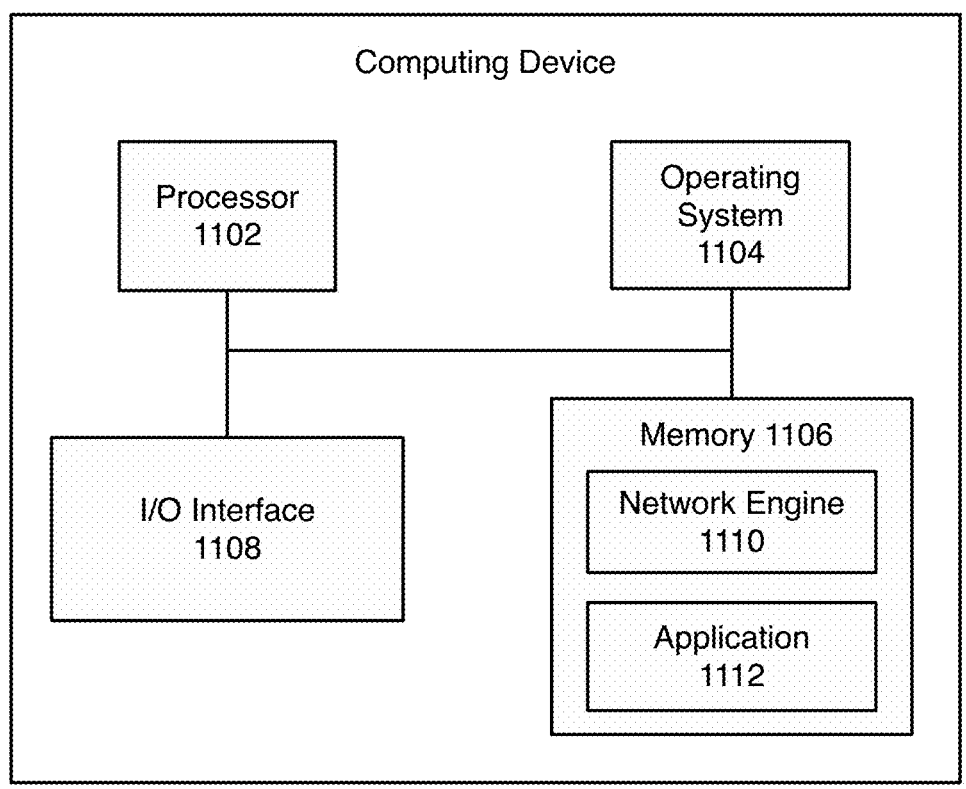
FIG. 11 illustrates a block diagram of an example computing device, according to some implementations.

FIG. 11 illustrates a block diagram of an example computing device 1100, according to some implementations. For example, computing device 1100 may be used to implement a sensor device such as modular sensor device 200 of FIGS. 2-6. In some implementations, computing device 1100 includes a processor 1102, an operating system 1104, a memory 1106, and an input/output (I/O) interface 1108. Computing device 1100 also includes a network engine 1110 and an application 1112, which may be stored in memory 1106 or on any other suitable storage location or computer-readable medium. Application 1112 provides instructions that enable processor 1102 to perform the functions described herein and other functions. For ease of illustration, one application 1112 is shown. Application 1112 may represent multiple applications. For example, multiple applications such as a health application and other applications, etc. may be stored in memory 1106 and executed by processor 1102.

For ease of illustration, FIG. 11 shows one block for each of processor 1102, operating system 1104, memory 1106, I/O interface 1108, network engine 1110, and application 1112. These blocks 1102, 1104, 1106, 1108, 1110, and 1112 may represent multiple processors, operating systems, memories, I/O interfaces, network engines, and applications. In other implementations, computing device 1100 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations. For example, some implementations are described herein in the context of a wireless mesh network system. However, the implementations described herein may apply in contexts other than a wireless mesh network.

Note that the functional blocks, methods, devices, and systems described in the present disclosure may be integrated or divided into different combinations of systems, devices, and functional blocks as would be known to those skilled in the art.

In some implementations, a non-transitory computer-readable storage medium carries program instructions thereon, where the instructions when executed by one or more processors cause the one or more processors to perform operations including one or more of the steps described herein.

In some implementations, a method includes one or more means for performing one or more of the steps described herein.

In some implementations, a system includes one or more processors, and logic encoded in one or more non-transitory tangible media for execution by the one or more processors. When executed, the logic is operable to perform operations including one or more of the steps described herein.

In some implementations, a system includes a storage device, and one or more processors accessing the storage device and operable to perform operations including one or more of the steps described herein.

The foregoing description includes references to the accompanying drawings, which form a part of the detailed description. The drawings show specific implementations by way of illustration. In the various descriptions, these implementations are also referred to herein as "implementations" and/or "examples." Such examples may include elements in addition to those shown or described. Such examples may optionally omit some elements mentioned. Moreover, such examples may include any combination or permutation of those elements shown or described (or one or more aspects thereof).

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), solid state memory (e.g., flash memory, etc.), or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, etc.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A residential modular sensor device comprising:
a base that attaches to a wall in a living space;
a power unit coupled to a first side of the base, wherein the power unit receives high-voltage power from a power source and outputs low-voltage power, wherein the high-voltage power is alternating current (AC) power, wherein the low-voltage power is direct current (DC) power, and wherein the power unit includes one or more devices that control conditions in an environment of the living space; and
a control module removably coupled to a second side of the base, wherein the power unit provides low-voltage power to the control module, wherein AC power in the power unit is isolated from the control module, wherein the control module receiving the low-voltage power from the power unit is hot-swappable so that the control module is physically separable away from the power unit, and wherein the control module performs one or more predetermined control functions.

2. The residential modular sensor device of claim 1, wherein the power unit remains powered by the high-voltage power while the control module is hot swapped with another control module.

3. The residential modular sensor device of claim 1, wherein the module comprises:
one or more sensors;
one or more processors; and
logic encoded in one or more non-transitory computer-readable storage media for execution by the one or more processors and when executed operable to perform operations comprising:
receiving sensor information from the one or more sensors;
generating one or more control signals based on the sensor information; and
sending the one or more control signals to the power unit, wherein the one or more control signals control one or more of the devices of the power unit.

4. The residential modular sensor device of claim 1, wherein the control module comprises one or more electrical switches for controlling one or more lights in the living space.

5. The residential modular sensor device of claim 1, wherein the control module comprises a touchscreen that receives control input from the user.

6. The residential modular sensor device of claim 1, wherein the control module comprises one or more feedback mechanisms that provide feedback to a user operating the control module.

7. The residential modular sensor device of claim 1, wherein at least one of the devices of the power unit is a dimming circuit that controls a brightness of one or more lights in the living space.

8. The residential modular sensor device of claim 1, wherein at least one of the devices of the power unit is an energy metering device.

9. The residential modular sensor device of claim 1, wherein the power unit comprises one or more dimming circuits for providing power to one or more respective electrical switches for controlling one or more lights in the living space.

10. A residential modular sensor system comprising:
a base that attaches to a wall in a living space;
a power unit coupled to a first side of the base, wherein the power unit receives high-voltage power from a power source and outputs low-voltage power, wherein the high-voltage power is alternating current (AC) power, wherein the low-voltage power is direct current (DC) power, and wherein the power unit includes one or more devices that control conditions in an environment of the living space; and
a plurality of control modules, wherein each control module is configured to be removably coupled to a second side of the base, wherein the second side of the base is configured to receive at least one control module of the plurality of control modules, wherein the power unit provides low-voltage power to the at least one control module, wherein AC power in the power unit is isolated from the control module, and wherein each control module receiving the low-voltage power from the power unit is hot-swappable so that the at least one control module is physically separable away from the power unit, and wherein the at least one control module performs one or more predetermined control functions.

11. The residential modular sensor system of claim 10, wherein the power unit handles alternating current (AC), and wherein the at least one control module handles direct current (DC).

12. The residential modular sensor system of claim 10, wherein the module comprises:
one or more sensors;
one or more processors; and
logic encoded in one or more non-transitory computer-readable storage media for execution by the one or more processors and when executed operable to perform operations comprising:

receiving sensor information from the one or more sensors;

generating one or more control signals based on the sensor information; and sending the one or more control signals to the power unit, wherein the one or more control signals control one or more of the devices of the power unit.

13. The residential modular sensor system of claim 10, wherein the at least one control module comprises one or more electrical switches for controlling one or more lights in the living space.

14. The residential modular sensor system of claim 10, wherein the at least one control module comprises a touchscreen that receives control input from the user.

15. The residential modular sensor system of claim 10, wherein the at least one control module comprises one or more feedback mechanisms that provide feedback to a user operating the control module.

16. The residential modular sensor system of claim 10, wherein at least one of the devices of the power unit has a dimming circuit that controls a brightness of one or more lights in the living space.

17. The residential modular sensor system of claim 10, wherein at least one of the devices of the power unit is an energy metering device.

18. A computer-implemented method for operation of a residential modular sensor device, the method comprising:

receiving, at a power unit, high-voltage power from a power source, wherein the high-voltage power is alternating current (AC) power, wherein the power unit is coupled to a first side of a base that attaches to a wall in a living space, wherein the power unit includes one or more devices that control conditions in an environment of the living space;

outputting, by the power unit, low-voltage power, wherein the low-voltage power is direct current (DC) power;

receiving, at a control module, sensor information from one or more sensors, wherein the control module is removably coupled to a second side of the base, wherein the power unit provides the low-voltage power to the control module, wherein AC power in the power unit is isolated from the control module, and wherein the control module receiving the low-voltage power from the power unit is hot-swappable so that the control module is physically separable away from the power unit;

generating, at the control module, one or more control signals based on the sensor information, wherein the control module performs one or more predetermined control functions; and controlling, at the power unit, one or more of the devices of the power unit based on the one or more control signals, wherein the one or more devices of the power unit control conditions of an environment of a living space.

\* \* \* \* \*